(12) United States Patent
Mikoshiba

(10) Patent No.: US 12,264,436 B2
(45) Date of Patent: Apr. 1, 2025

(54) SHEET MANUFACTURING APPARATUS

(71) Applicant: SEIKO EPSON CORPORATION, Tokyo (JP)

(72) Inventor: Takao Mikoshiba, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 253 days.

(21) Appl. No.: 18/191,041

(22) Filed: Mar. 28, 2023

(65) Prior Publication Data

US 2023/0313460 A1 Oct. 5, 2023

(30) Foreign Application Priority Data

Mar. 30, 2022 (JP) ................... 2022-055328

(51) Int. Cl.
*D21G 9/00* (2006.01)
*D21H 11/14* (2006.01)

(52) U.S. Cl.
CPC ........... *D21G 9/0018* (2013.01); *D21H 11/14* (2013.01)

(58) Field of Classification Search
CPC .......... D21F 9/00; D21G 9/0018; D21G 9/00; D21B 1/061; D21B 1/08; D21B 1/068; D21H 11/14
See application file for complete search history.

(56) References Cited

U.S. PATENT DOCUMENTS

| 4,098,464 A * | 7/1978 | Niedner | B03B 9/06 |
| | | | 241/24.22 |
| 6,136,590 A * | 10/2000 | Kruse | C05F 9/02 |
| | | | 241/DIG. 38 |
| 7,815,741 B2 * | 10/2010 | Olson | C13K 1/02 |
| | | | 127/23 |
| 10,350,784 B2 * | 7/2019 | Murayama | D21F 9/00 |
| 2016/0221214 A1 * | 8/2016 | Monbetsu | B27N 3/04 |

(Continued)

FOREIGN PATENT DOCUMENTS

| CN | 106453489 A | * | 2/2017 |
| CN | 118719768 A | * | 10/2024 |

(Continued)

*Primary Examiner* — Carlos N Lopez
(74) *Attorney, Agent, or Firm* — Global IP Counselors, LLP

(57) ABSTRACT

A sheet manufacturing apparatus that manufactures a sheet-shaped recycled paper using coarsely crushed pieces obtained by coarsely crushing a sheet containing fibers as a raw material, includes a container loading section that is configured to load a container in which the coarsely crushed pieces are housed and which has an information carrying section for carrying information related to characteristics of the housed coarsely crushed pieces, a reading section that reads the information carried by the information carrying section, a determination section that determines whether or not the coarsely crushed pieces in the container are suitable as the raw material for sheet manufacturing by the sheet manufacturing apparatus based on the information read by the reading section, and a switching section that switches between a first state in which the container is configured to be loaded into the container loading section and a second state in which the container is prevented from being loaded into the container loading section according to a determination result of the determination section.

7 Claims, 7 Drawing Sheets

(56) References Cited

U.S. PATENT DOCUMENTS

| | | | |
|---|---|---|---|
| 2019/0240607 A1* | 8/2019 | Yamada | B01D 46/71 |
| 2020/0165092 A1* | 5/2020 | Mikoshiba | D21F 7/006 |
| 2023/0073306 A1* | 3/2023 | Koike | A01G 13/0268 |
| 2023/0304223 A1* | 9/2023 | Mikoshiba | D21B 1/061 |
| 2024/0102240 A1* | 3/2024 | Sakurada | D21F 9/00 |
| 2024/0167223 A1* | 5/2024 | Horiko | D21B 1/347 |

FOREIGN PATENT DOCUMENTS

| | | | | |
|---|---|---|---|---|
| DE | 202019106364 U1 * | 1/2020 | | D21C 5/00 |
| JP | 2003340823 A * | 12/2003 | | |
| JP | 2006104633 A * | 4/2006 | | |
| JP | 2010180512 A * | 8/2010 | | D21B 1/32 |
| JP | 2016137608 A * | 8/2016 | | |
| JP | 2019173196 A * | 10/2019 | | D21B 1/10 |
| JP | 2021178703 A * | 11/2021 | | B01F 27/90 |
| JP | 2023132517 A * | 9/2023 | | |
| WO | WO-03107103 A1 * | 12/2003 | | D21G 9/0018 |
| WO | WO-2015128912 A1 * | 9/2015 | | B27N 1/00 |
| WO | WO-2016035313 A1 * | 3/2016 | | B65H 1/14 |
| WO | WO-2018180067 A1 * | 10/2018 | | B27N 3/04 |

\* cited by examiner

SHEET MANUFACTURING APPARATUS

The present application is based on, and claims priority from JP Application Serial Number 2022-055328, filed Mar. 30, 2022, the disclosure of which is hereby incorporated by reference herein in its entirety.

BACKGROUND

1. Technical Field

The present disclosure relates to a sheet manufacturing apparatus.

2. Related Art

A dry-type sheet manufacturing apparatus is known which obtains sheet-shaped recycled paper by coarsely crushing waste paper, such as used copy paper, into strips to make coarsely crushed pieces, defibrating the coarsely crushed pieces, accumulating the defibrated materials on a flat surface, heating the accumulated materials, and applying pressure. It is preferable that the sheet manufacturing apparatus contributes to reducing the burdens on the global environment.

For example, JP-A-2006-104633 discloses a sheet manufacturing apparatus including a coarsely crushing section that coarsely crushes waste paper, a reserving section that reserves coarsely crushed pieces obtained by the coarsely crushing section, a defibrating section that defibrates the coarsely crushed pieces reserved in the reserving section, an accumulation section that accumulates the defibrated material obtained by the defibrating section on a flat surface, a heating and pressurizing section that heats and pressurizes accumulated web, a cutting section that cuts a sheet obtained by the heating and pressurizing section into a predetermined shape, and a sheet collection section that collects the obtained sheet.

In addition, in the sheet manufacturing apparatus having the configuration disclosed in JP-A-2006-104633, a sheet manufacturing apparatus, which does not have the coarsely crushing section is also known. In this case, the coarsely crushed pieces are supplied to the sheet manufacturing apparatus using a method of transporting the coarsely crushed pieces, which are raw materials for sheet manufacturing, from another location and filling the reserving section.

However, in the method of transporting the coarsely crushed pieces and filling the reserving section, there is a problem in that the quality of the manufactured sheet is deteriorated when the characteristics of the coarsely crushed pieces to be filled in the reserving section, for example, the shape, the size, the thickness, the basis weight, and the paper quality are inappropriate.

SUMMARY

According to an aspect of the present disclosure, there is provided a sheet manufacturing apparatus that manufactures a sheet-shaped recycled paper using coarsely crushed pieces obtained by coarsely crushing a sheet containing fibers as a raw material, the sheet manufacturing apparatus including a container loading section that is configured to load a container in which the coarsely crushed pieces are housed and which has an information carrying section for carrying information related to characteristics of the housed coarsely crushed pieces, a reading section that reads the information carried by the information carrying section, a determination section that determines whether or not the coarsely crushed pieces in the container are suitable as the raw material for sheet manufacturing by the sheet manufacturing apparatus based on the information read by the reading section, and a switching section that switches between a first state in which the container is configured to be loaded into the container loading section and a second state in which the container is prevented from being loaded into the container loading section according to a determination result of the determination section.

DESCRIPTION OF EXEMPLARY EMBODIMENTS

Hereinafter, a sheet manufacturing apparatus of the present disclosure will be described in detail based on a preferred embodiment shown in the accompanying drawings.

First Embodiment

Figure 1:
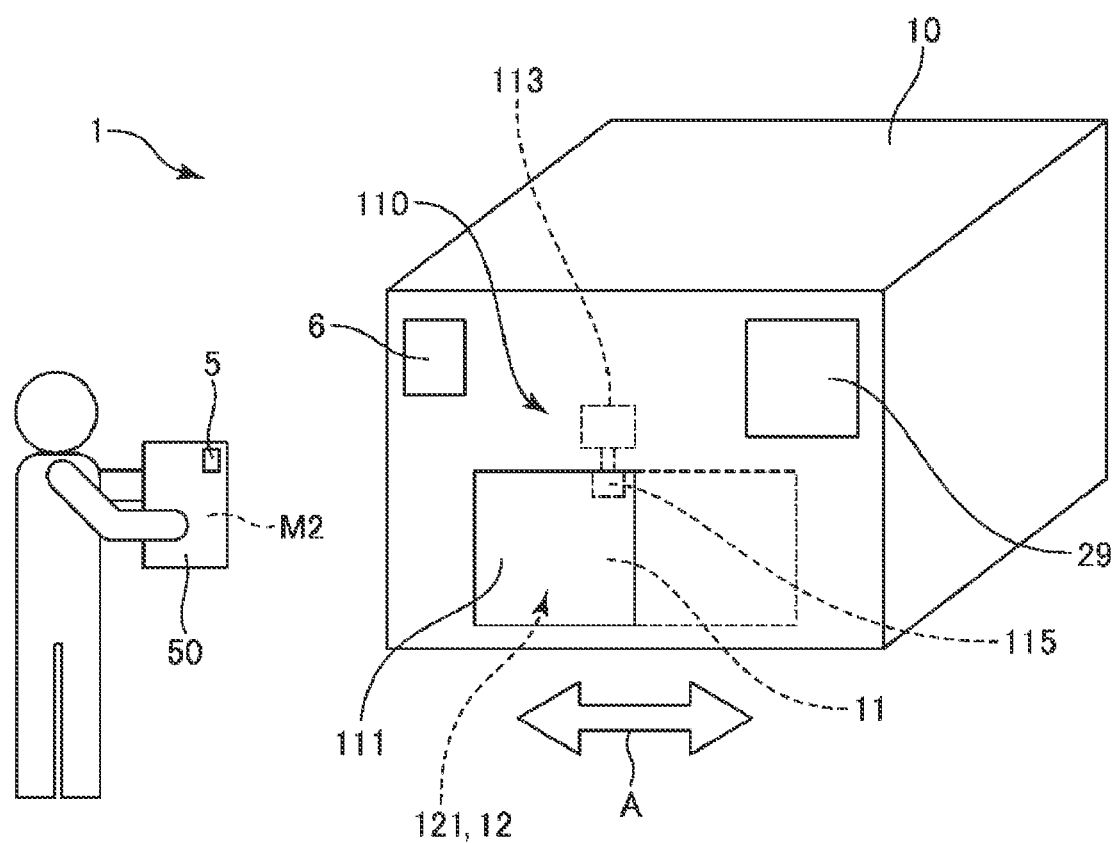
FIG. 1 is a perspective view showing an outline of a sheet manufacturing apparatus according to a first embodiment.
Figure 2:
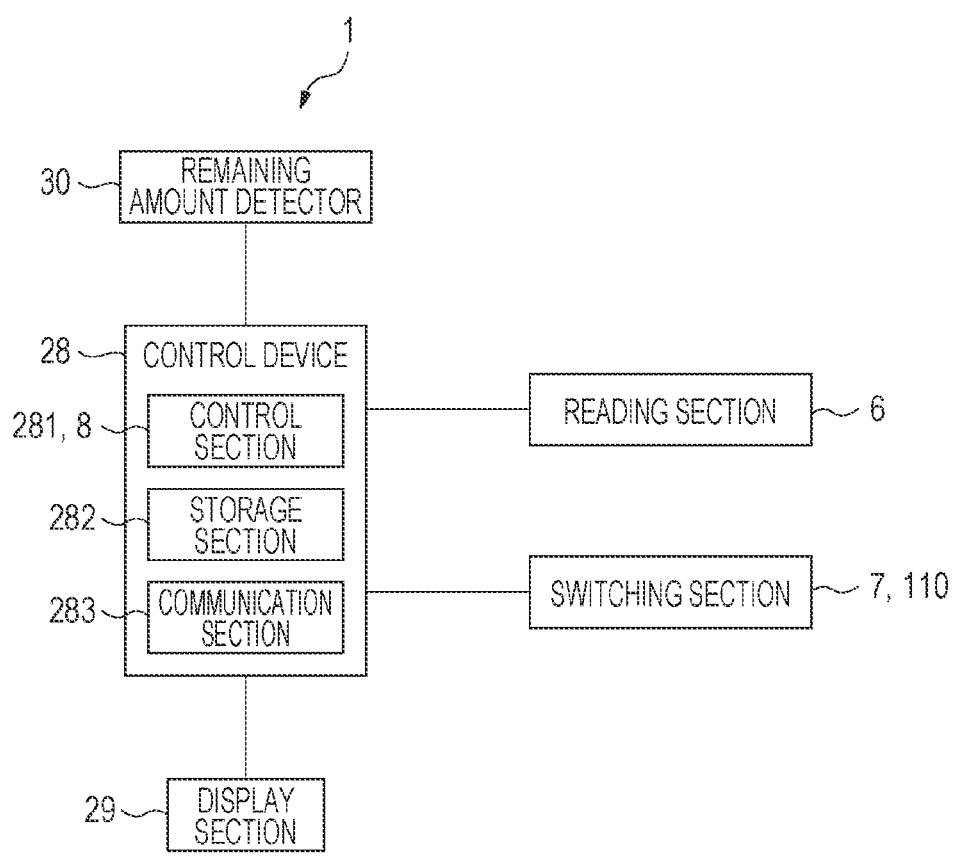
FIG. 2 is a block diagram of the sheet manufacturing apparatus shown in FIG. 1.
Figure 3:
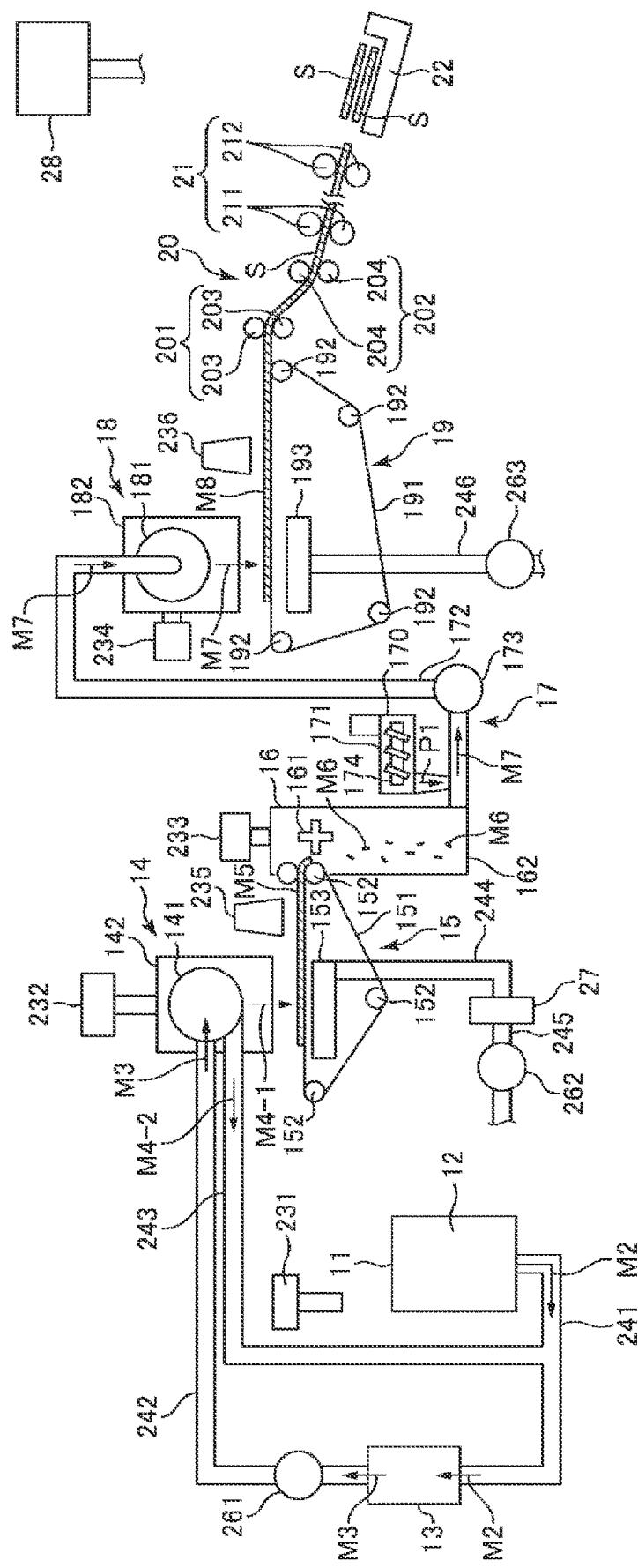
FIG. 3 is a configuration diagram showing the outline of the sheet manufacturing apparatus shown in FIG. 1.
Figure 4:
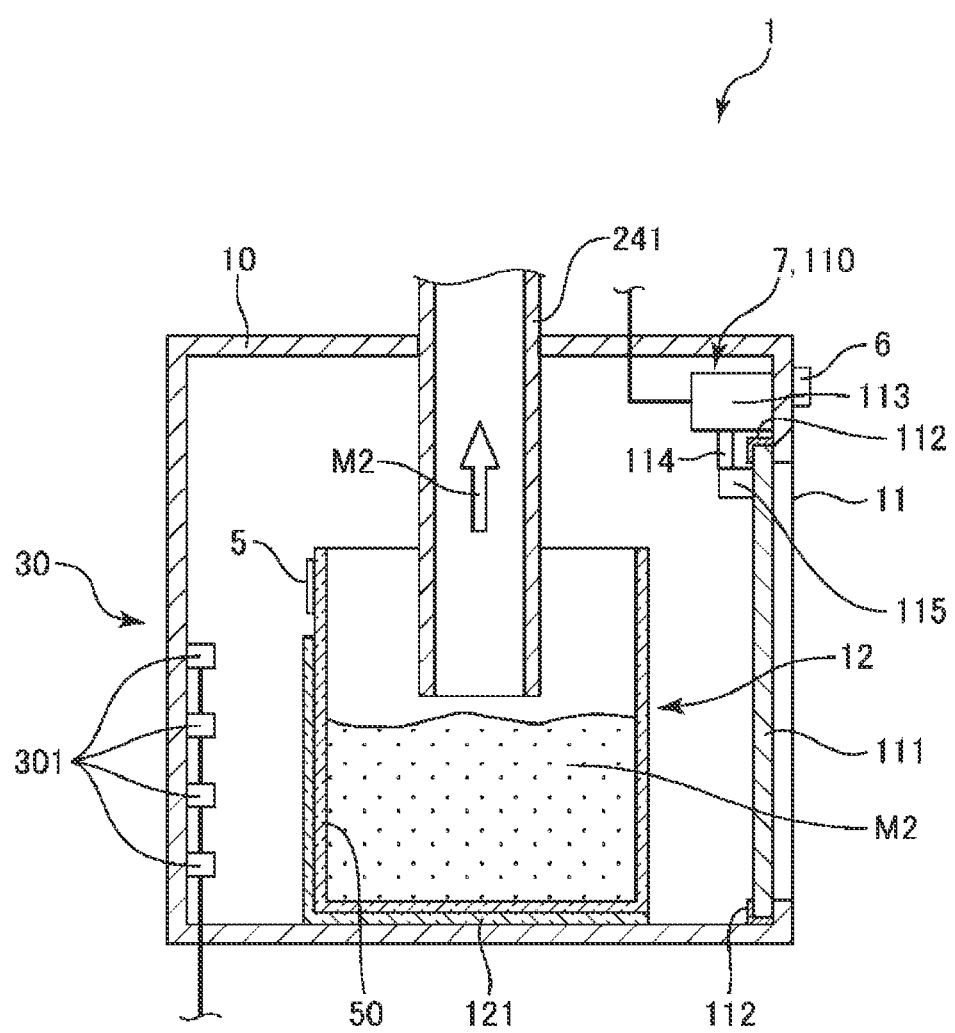
FIG. 4 is a cross-sectional side view of a reserving section included in the sheet manufacturing apparatus shown in FIG. 1.
Figure 5:
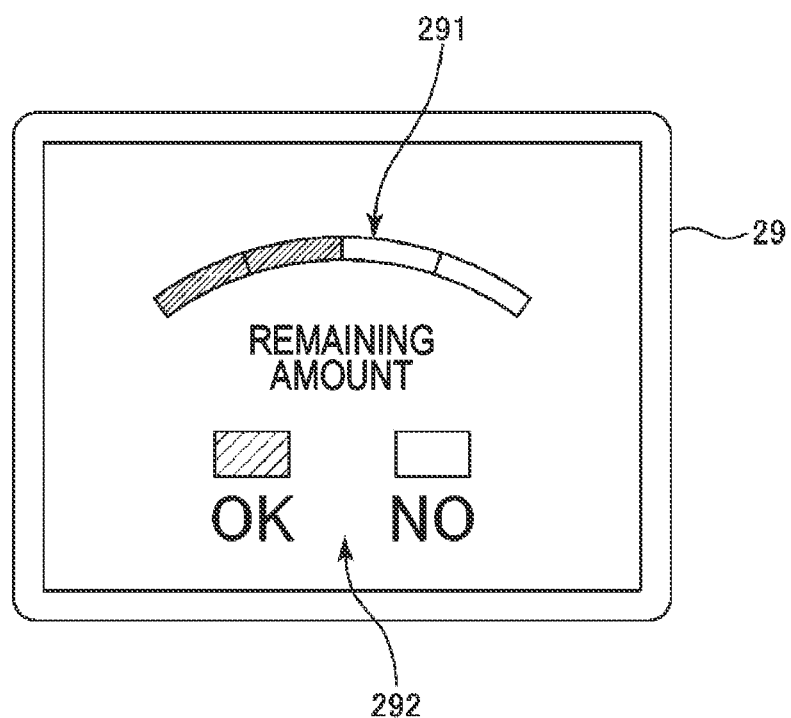
FIG. 5 is a front view of a display section included in the sheet manufacturing apparatus shown in FIG. 1.

FIG. 1 is a perspective view showing an outline of the sheet manufacturing apparatus according to the first embodiment. FIG. 2 is a block diagram of the sheet manufacturing apparatus shown in FIG. 1. FIG. 3 is a configuration diagram showing the outline of the sheet manufacturing apparatus shown in FIG. 1. FIG. 4 is a cross-sectional side view of a reserving section included in the sheet manufacturing apparatus shown in FIG. 1. FIG. 5 is a front view of a display section included in the sheet manufacturing apparatus shown in FIG. 1.

Hereinafter, in FIGS. 1, 3, and 4, an upper side may be referred to as "upper" or "upward", and a lower side may be referred to as "lower" or "downward". In addition, FIG. 3 is a schematic configuration diagram, and the positional relationship, orientation, size, and the like of each section of the sheet manufacturing apparatus 1 are not limited to those shown in the drawing. In addition, in each drawing, directions through which coarsely crushed pieces M2, a defibrated material M3, a first sorted material M4-1, a second sorted material M4-2, a first web M5, subdivided bodies M6, a mixture M7, a second web M8, and a recycled paper S are transported, that is, a direction indicated by arrows are also referred to as a transport direction. In addition, a tip end side of the arrow in FIG. 3 is also referred to as "downstream"

in the transport direction, and a base end side of the arrow in FIG. 3 is also referred to as "upstream" in the transport direction.

The sheet manufacturing apparatus 1 shown in FIGS. 1 to 3 is a sheet manufacturing apparatus 1 that generates sheet-shaped recycled paper S using the coarsely crushed pieces M2 of waste paper such as used copy paper as a raw material. The coarsely crushed pieces M2 are supplied to a reserving section 12 of the sheet manufacturing apparatus 1, a process as will be described later is performed with respect to the supplied coarsely crushed pieces M2, and recycled paper S is regenerated.

The coarsely crushed pieces M2 are supplied to the sheet manufacturing apparatus 1 as follows. In a state in which the coarsely crushed pieces M2 are put in the container 50, the container 50 is transported to and loaded into the reserving section 12 of the sheet manufacturing apparatus 1 shown in FIGS. 1 and 4.

The container 50 may be any container as long as it can house the coarsely crushed pieces M2, and may be either soft or hard in form. Hereinafter, in the present embodiment, the container 50 will be described as a hard container, for example, a bottle or the like. In this case, the constituent materials of the container 50 are not particularly limited, and, examples of the constituent materials of the container 50 include, for example, plastic materials such as polyethylene, polypropylene, polystyrene, polyester, and polycarbonate, various glass materials, paper materials such as corrugated cardboard and thick paper, wood, various rubber materials, and various ceramics, various metal materials, and the like. When the constituent materials of the container 50 are made of light-transmitting materials, such as transparent or translucent materials, visibility of the coarsely crushed pieces M2 housed inside can be obtained, which is preferable.

The container 50 is not limited to the hard container, and may be a bag-shaped container which is soft, that is, flexible and deformable.

In addition, although not shown in the drawing, the container 50 may have a container main body and a lid that closes the upper opening of the container main body. In this case, the container main body and the lid are made of the same materials as the constituent materials of the container 50 described above. In addition, it is preferable that the container main body is made of a light-transmitting material.

The coarsely crushed pieces M2 are obtained by coarsely crushing a sheet containing fibers (hereinafter, also referred to as "raw material sheet") with, for example, a coarsely crushing apparatus. A typical example of the coarsely crushed pieces M2 is a strip-shaped shredder piece cut with a shredder.

Examples of the raw material sheet for the coarsely crushed pieces M2 include a sheet-shaped material made of a fiber content containing a cellulose fiber. The cellulose fiber may be a fibrous material containing cellulose as a compound as a main component, and may contain hemicellulose and lignin in addition to the cellulose.

Examples of the raw material sheet for the coarsely crushed pieces M2 include used or unused paper, woven fabric, and non-woven fabric. Examples of paper include high-quality paper, recycled paper manufactured by defibrating and regenerating waste paper, white paperboard, craft paper, mat paper, kent paper, special paper, straw paper, newspaper, thick paper, and YUPO paper (registered trademark).

The paper type, paper quality, and the like of the sheet raw material of the coarsely crushed pieces M2 as described above affect the quality of the recycled paper S generated by the sheet manufacturing apparatus 1.

It is preferable that the shape, the size, the thickness, and the basis weight of the coarsely crushed pieces M2 are suitable for the defibrating process in a defibrating section 13, which will be described later. Examples of the shapes of the coarsely crushed pieces M2 include a small piece having a square shape in a planar shape and a small piece having a rectangular shape, particularly, a strip shape. In addition, it is preferable that the sizes of the coarsely crushed pieces M2 are, for example, small pieces having an average length of one side of 100 mm or less, and it is more preferable that the sizes are small pieces of 3 mm or more and 70 mm or less. The shape of the small piece may be other than the square shape or the rectangular shape. It is preferable that the thickness is 0.07 mm or more and 0.10 mm or less. It is preferable that the basis weight is 64 $g/m^2$ or more and 90 $g/m^2$ or less.

The coarsely crushed pieces M2 become a defibrated material M3 after the defibrating process is performed by the defibrating section 13. However, the shape and size of the coarsely crushed pieces M2 described above affect the properties, characteristics, uniformity, the degree of defibration, and the like of the defibrated material M3 obtained by the defibrating section 13, thereby affecting the quality of the recycled paper S to be generated, as a result.

Although not shown in the drawing, in the coarsely crushing apparatus such as a shredder, a raw material sheet is coarsely crushed to obtain the coarsely crushed pieces M2, and the obtained coarsely crushed pieces M2 are integrated in the container 50 loaded into an integration section of the coarsely crushing apparatus. The coarsely crushed pieces M2 integrated in the container 50 are collected for each container 50, transported to and loaded into the reserving section 12 of the sheet manufacturing apparatus 1, and supplied to manufacture the recycled paper S. In this case, the container 50 can be loaded into both the integration section of the coarsely crushing apparatus and the reserving section 12 of the sheet manufacturing apparatus 1. That is, the container 50 is also used as being compatible between the coarsely crushing apparatus and the sheet manufacturing apparatus 1.

In addition, the supply of the coarsely crushed pieces M2 to the sheet manufacturing apparatus 1 is not limited to the method. For example, a trader collects the coarsely crushed pieces M2 and fills the container 50 with the coarsely crushed pieces M2. The user of the sheet manufacturing apparatus 1 obtains the container 50 filled with the coarsely crushed pieces M2 for a fee or free of charge, and loads the container 50 in the reserving section 12 of the sheet manufacturing apparatus 1.

An information carrying section 5 that carries information as will be described later is attached to the container 50. The information carrying section 5 may be attached to the outer surface of the container 50 or may be coupled to the container 50 via, for example, a flexible coupling member such as a string or tape. In addition, when the container 50 has the container main body and the lid that closes the upper opening of the container main body, the information carrying section 5 may be attached to the lid. In addition, the information carrying section 5 may be fixedly installed with respect to the container 50 or may be detachably installed.

The main information carried by the information carrying section 5 is information related to the characteristics of the coarsely crushed pieces M2 housed in the container 50.

Hereinafter, the information related to the characteristics of the coarsely crushed pieces M2 is simply referred to as "characteristic information".

Examples of the characteristic information include the shape, the size, the thickness, the basis weight, the paper type, the paper quality, the whiteness, the bulk density of the fiber, the average fiber length, and the water content of the coarsely crushed pieces M2 housed in the container 50, and at least one piece of characteristic information is carried in the information carrying section 5. The reason for this is that the pieces of characteristic information often affect the quality of the recycled paper S to be generated.

In particular, it is preferable that at least one piece of characteristic information of the shape, the size, the thickness, the basis weight, the paper type, and the paper quality of the coarsely crushed pieces M2 housed in the container 50 is carried in the information carrying section 5. It is more preferable that a plurality of pieces of characteristic information including the size, the thickness, the basis weight, the paper type, and the paper quality are carried, and it is further more preferable that all the pieces of characteristic information are carried. The reason for this is that the pieces of characteristic information often have a relatively large effect on the quality of the recycled paper S to be generated.

The shape, the size, the thickness, the basis weight, the paper type, and the paper quality of the coarsely crushed pieces M2 are as described above. The raw material sheet of the coarsely crushed pieces M2 is often used copy paper, but, when the residual amount of toner is large, the whiteness of the coarsely crushed pieces M2 is lowered, and the quality of the generated recycled paper S, that is, the whiteness is lowered.

The bulk density of the fiber is mainly the bulk density of the cellulose fiber. Specifically, it is preferable that the bulk density is 0.8 $g/m^3$ or more and 0.9 $g/m^3$ or less.

It is preferable that the average fiber length is 0.5 μm or more and 40 μm or less, and it is more preferable that the average fiber length is 1 μm or more and 30 μm or less.

Specifically, it is preferable that the water content is 5% or more and 15% or less.

The bulk density, the average fiber length, and the water content of the fiber affect the defibrating degree, thereby affecting the quality of the recycled paper S to be generated.

As described above, the pieces of information carried by the information carrying section 5 are pieces of information related to the characteristics of the coarsely crushed pieces M2, that is, the pieces of characteristic information. The characteristic information is at least one piece of information of the shape, the size, the thickness, the basis weight, the paper type, the paper quality, the whiteness, the bulk density of the fiber, the average fiber length, and the water content of the coarsely crushed pieces M2. These pieces of characteristic information often affect the quality of the recycled paper S to be generated. Therefore, based on these pieces of characteristic information, the eligibility of the coarsely crushed pieces M2 in the container 50 as the raw material for sheet manufacturing is determined, whether or not to load the container 50 into the container loading section 121 is determined according to the determination result, and the loading is executed. Therefore, it is possible to further improve the quality of the recycled paper S to be generated.

The information carrying section 5 may rewrite or non-rewrite the information. Examples of the configuration of the information carrying section 5 are not particularly limited, and include a two-dimensional code, a three-dimensional code, and other identifiers. Examples of the two-dimensional code include a barcode, and examples of the three-dimensional code include a QR code (registered trademark). With such a two-dimensional code and a three-dimensional code, when the container 50 is filled with the coarsely crushed pieces M2, a pattern corresponding to the pieces of characteristic information of the coarsely crushed pieces M2 is issued by label printing or the like, and the pattern can be attached to or coupled to the container 50.

In addition, examples of other configurations of the information carrying section 5 include an IC tag and other IC chips. With the IC tag and the IC chips, pieces of information are written when the container 50 is filled with the IC tag and other IC chips, and the IC tag and the IC chips can be attached to or coupled to the container 50. In addition, an IC tag or an IC chip, in which pieces of information corresponding to the coarsely crushed pieces M2 scheduled to be housed in the container 50 are written in advance, can be attached to or coupled to the container 50.

Furthermore, the information carrying section 5 may be configured by a recording medium such as a magnetic recording medium, an optical recording medium, or a magneto-optical recording medium, and the recording medium may be rewritable or non-rewritable. The relationship between the time when the information carrying section 5 is installed in the container 50 and the time when the information is written is the same as that in the other form of the information carrying section 5.

As shown in FIGS. 1 and 4, a reading section 6 that reads information carried by the information carrying section 5 is installed on the front surface of the housing 10.

When the configuration of the information carrying section 5 is a two-dimensional code or a three-dimensional code, the reading section 6 is a code reader, and, when the configuration of the information carrying section 5 is an IC tag, the reading section 6 is an IC reader. In addition, when the configuration of the information carrying section 5 is a recording medium, the reading section 6 is a recording medium regeneration device.

The reading section 6 is not limited to when being fixedly installed in the housing 10, and, for example, a configuration may be provided in which a reading section main body is coupled to the housing 10 via a wire containing a communication line. Further, the reading section 6 may not be physically coupled to the housing 10 and may be configured to exchange information with the control device 28 by wireless communication.

As described above, the information carrying section 5 is a two-dimensional or three-dimensional code, and the reading section 6 is a code reader. As a result, the information carrying section 5 and the reading section 6 are excellent in versatility and compatibility, and are easy to perform a reading operation.

In addition, the information carrying section 5 is an IC tag, and the reading section 6 is an IC reader. As a result, the information carrying section 5 has an advantage that the information can be rewritten. For example, the information carrying section 5 can be used when the coarsely crushed pieces M2 having different characteristics are replaced and reused in the container 50, so that there is an advantage that the container 50 can be reused.

Information other than the pieces of characteristic information described above can be carried on the information carrying section 5. For example, information related to the volume or weight of the coarsely crushed pieces M2 housed in the container 50 can be written in the information carrying section 5.

In addition, the information carrying section 5 may carry at least one of ID information of a user who is permitted to use the sheet manufacturing apparatus 1 and ID information of the sheet manufacturing apparatus, as additional information. In this case, the ID information of the user who is permitted to use the sheet manufacturing apparatus 1 and the ID information of the sheet manufacturing apparatus, which are carried on the information carrying section 5, are read, and the determination section 8 determines whether or not the pieces of ID information are appropriate. That is, the determination section 8 compares the ID information of the user who is permitted to use the sheet manufacturing apparatus 1 and the ID information of the sheet manufacturing apparatus with the ID information of the user of the sheet manufacturing apparatus 1 and the ID information unique to the sheet manufacturing apparatus 1, which are stored in the storage section 282 prior to determining the suitability of the coarsely crushed pieces M2 which will be described later, and determines whether or not the pieces of ID information match each other. When both the ID information of the user and the ID information of the sheet manufacturing apparatus match, a subsequent step is performed, that is, the suitability of the coarsely crushed pieces M2 is determined, and, in other cases, a second state which will be described later is maintained. The determination result of the appropriateness determination of the user or the sheet manufacturing apparatus can also be displayed on the display section 29.

The ID information of the sheet manufacturing apparatus is, for example, information such as a manufacturing number, a manufacturing date, a model number, a manufacturing location, or the like. The user ID information is, for example, information such as a company name, a corporate name, an individual name, or the like.

As described above, the information carried by the information carrying section 5 includes at least one of the ID information of the user who is permitted to use the sheet manufacturing apparatus 1 and the ID information of the sheet manufacturing apparatus 1, as the additional information. As a result, the appropriateness of the user and the appropriateness of the sheet manufacturing apparatus 1 can be easily grasped, erroneous loading of the container 50 and the like can be prevented, and security management and other management can be facilitated.

As above, the information read by the reading section 6 can be used for various management, control, and the like in the sheet manufacturing apparatus 1, and can be displayed on the display section 29.

As shown in FIG. 3, the sheet manufacturing apparatus 1 is an apparatus that obtains a recycled paper S, which is a sheet-shaped molded product, by defibrating the supplied coarsely crushed pieces M2, mixing the binder P1 with the obtained defibrated material M3, accumulating the mixture M7, and forming a second web M8, which is the accumulated material, by a molding section 20.

The sheet manufacturing apparatus 1 shown in FIGS. 2 and 3 includes an insertion port 11 for inserting the coarsely crushed pieces M2 for each container 50, a reserving section 12 for reserving the inserted coarsely crushed pieces M2, a defibrating section 13 for defibrating the coarsely crushed pieces M2, a sorting section 14 for sorting the defibrated material M3, a first web forming section 15, a subdividing section 16, a mixing section 17, a dispersion section 18, a second web forming section 19, a molding section 20, a cutting section 21, a stock section 22, a collection section 27, a display section 29, a remaining amount detector 30, and a control device 28 for controlling the operation of each section.

In addition, the sheet manufacturing apparatus 1 includes a humidifying section 231, a humidifying section 232, a humidifying section 233, a humidifying section 234, a humidifying section 235, and a humidifying section 236. In addition, the sheet manufacturing apparatus 1 includes a blower 261, a blower 262, and a blower 263.

In addition, the humidifying sections 231 to 236 and the blowers 261 to 263 are electrically coupled to the control device 28, and the operations thereof are controlled by the control device 28.

In addition, the sheet manufacturing apparatus 1 executes a coarsely crushed piece reserving step, a defibrating step, a sorting step, a first web forming step, a dividing step, a mixing step, a releasing step, an accumulating step, a sheet forming step, and a cutting step in this order. Hereinafter, the configuration of each section of the sheet manufacturing apparatus 1 that performs these steps will be described.

The sheet manufacturing apparatus 1 has the reserving section 12 including a container loading section 121 for performing the coarsely crushed piece reserving step of reserving the coarsely crushed pieces M2.

As shown in FIGS. 1 and 4, the sheet manufacturing apparatus 1 has the housing 10 containing the reserving section 12, and the insertion port 11 for inserting the coarsely crushed pieces M2 is provided on a wall portion of the housing 10. The insertion port 11 has openings provided in the wall portions on the front surface in FIG. 1 and the right side surface in FIG. 4 of the housing 10. In addition, the insertion port 11 is provided with an opening/closing door 111 that opens and closes the opening of the insertion port 11. When the opening/closing door 111 is in an opened state, the container 50 in which the coarsely crushed pieces M2 are housed can be loaded into the container loading section 121 of the reserving section 12, or an empty container 50 or a container 50 having a low remaining amount can be taken out from the container loading section 121 of the reserving section 12.

The opening/closing door 111 is slidably supported by rails 112 installed at the upper end and the lower end of the insertion port 11 in a direction of arrow A in FIG. 1, that is, in a direction perpendicular to a paper surface in FIG. 4. The opening/closing door 111 is driven in the direction of arrow A by the opening/closing drive section 110 to open and close.

The opening/closing drive section 110 constitutes a so-called electric door opening/closing mechanism, and has a motor 113 as a drive source installed on a wall portion above the insertion port 11 and a roller 115 fixed to a rotary shaft 114 of the motor 113. The motor 113 has forward rotation and reverse rotation capabilities by switching an energization direction. The roller 115 is made of, for example, an elastic material such as rubber, and the outer peripheral surface of the roller 115 is pressed against the upper portion of the back surface of the opening/closing door 111.

When the motor 113 is energized from a closed state of the opening/closing door 111, that is, a state in which the opening of the insertion port 11 is covered, the roller 115 rotates in a predetermined direction, the opening/closing door 111 moves to the right direction in FIG. 1, and the opening of the insertion port 11 is released. That is, the opening/closing door 111 is in the opened state. When the motor 113 is energized in an opposite direction to the above direction in the opened state of the opening/closing door 111, the roller 115 rotates in the opposite direction to the above direction, the opening/closing door 111 moves to the left direction in FIG. 1, and the opening of the insertion port 11 is closed. That is, the opening/closing door 111 is in the closed state. In this way, the opening/closing door 111 is opened and closed by the operation of the opening/closing drive section 110.

As described above, the sheet manufacturing apparatus 1 has the reading section 6 that reads information carried by the information carrying section 5 attached to the container 50, the determination section 8 that determines whether or not the coarsely crushed pieces M2 in the container 50 is suitable as the raw material for sheet manufacturing by the sheet manufacturing apparatus 1, that is, determines suitability of eligibility as the raw material based on the information read by the reading section 6, and the opening/closing drive section 110 that is the switching section 7 which switches between a first state in which the container 50 can be loaded into the container loading section 121 and a second state in which the container 50 is prevented from being loaded into the container loading section 121 according to the determination result of the determination section 8. Here, the first state is to set the opening/closing door 111 in an opened state, and the second state is to set the opening/closing door 111 to the closed state.

The reserving section 12 has a box-shaped, frame-shaped, or plate-shaped container loading section 121 into which the container 50 containing the coarsely crushed pieces M2 are loaded. The form of the container loading section 121 is not particularly limited, as long as the container 50 can be detachably installed or held. When the container 50 is a self-supporting container, for example, a bottle or a bucket, the container loading section 121 can be a mounting table on which the container 50 can be mounted in contact with the bottom surface of the container 50. In addition, the container loading section 121 may be configured to suspend and hold the container 50.

As described above, the sheet manufacturing apparatus 1 includes the insertion port 11 that loads the container 50 into the container loading section 121, and an opening/closing door 111 that is provided at the insertion port 11 to open and close the insertion port 11, in which the switching section 7 has the opening/closing drive section 110 that switches between the first state in which the opening/closing door 111 is in the opened state and the second state in which the opening/closing door 111 is in the closed state. As a result, the first state and the second state can be set more reliably with a simple configuration.

As shown in FIG. 4, the reserving section 12 is provided with the remaining amount detector 30 that detects the remaining amount of the coarsely crushed pieces M2 in the reserving section 12. The remaining amount detector 30 is configured by a level sensor that detects the remaining amount of the coarsely crushed pieces M2 in the container 50 loaded into the reserving section 12 (hereinafter, simply referred to as "remaining amount"), particularly the volume as the position of the uppermost portion of the coarsely crushed pieces M2. The remaining amount detector 30 has a plurality of optical sensors 301, that is, four in the configuration shown in the drawing. Each optical sensor 301 is disposed apart from each other along the depth direction, that is, the vertical direction of the container 50 installed in the reserving section 12.

The container loading section 121 and the container 50 are made of a substantially transparent material and have light transmittance. Each optical sensor 301 is a reflection type optical sensor, and includes a light emitting section that emits laser light and a light reception section that receives reflected light of the laser light from the coarsely crushed pieces M2. When the laser light emitted from the light emitting section is reflected by the coarsely crushed pieces M2 and the reflected light is received, the received light is photoelectrically converted to output a signal, and the optical sensor 301 detects that the coarsely crushed pieces M2 are present at the installation height of the optical sensor 301. The remaining amount detector 30 can detect the height, that is, the volume of the coarsely crushed pieces M2 in the container 50 by combining the presence or absence of light reception of the reflected light from each optical sensor 301. For example, when all the optical sensors 301 do not receive the reflected light, the container 50 is determined to be empty, and, when all the optical sensors 301 receive the reflected light, the container 50 is determined to be fully reserved with the coarsely crushed pieces M2. By specifying the optical sensor 301, which receives or does not receive the reflected light, among the four optical sensors 301, the remaining amount of the coarsely crushed pieces M2 in the reserving section 12 can be detected.

The optical sensor 301 is not limited to a reflection type, and a transmission type optical sensor can be used. In addition, a capacitance sensor can be used instead of the optical sensor.

As shown in FIG. 2, the motor 113 that constitutes the opening/closing drive section 110 is electrically coupled to the control device 28 via a motor driver (not shown), and rotation, stop, and rotation directions are controlled by the control signal output from the control device 28.

In addition, as shown in FIG. 2, each optical sensor 301 that constitutes the remaining amount detector 30 is electrically coupled to the control device 28, and a signal output from each optical sensor 301 is input to the control device 28. In the control device 28, a predetermined process is performed on the input signal, and information related to the remaining amount of the coarsely crushed pieces M2 in the reserving section 12 can be obtained.

The remaining amount detector 30 is not limited to the configuration shown in the drawing, and may be configured by, for example, a weight sensor that measures the weight of the coarsely crushed pieces M2 in the container 50. Even in this case, the remaining amount of the coarsely crushed pieces M2 in the reserving section 12 can be detected.

Although not shown in the drawing, the reserving section 12 is coupled to a fixed-quantity supply section that quantitatively sends the coarsely crushed pieces M2 reserved in the reserving section 12 to the defibrating section 13. The coarsely crushed pieces M2 sent by the fixed-quantity supply section are transported to the defibrating section 13 through a pipe 241.

As shown in FIG. 3, the defibrating section 13 is a part that performs the defibrating step of defibrating the coarsely crushed pieces M2 in the air, that is, by a dry method. By performing the defibrating process in the defibrating section 13, the defibrated material M3 can be generated from the coarsely crushed pieces M2. Here, "defibrating" means unraveling the coarsely crushed pieces M2 in which a plurality of fibers are bound into individual fibers. Then, the unraveled material becomes the defibrated material M3. The shape of the defibrated material M3 is a linear shape or a band shape. In addition, the defibrated material M3 may be present in a state of being entangled with each other to form a lump, that is, in a state of forming a so-called "lump".

For example, in the present embodiment, the defibrating section 13 is configured by an impeller mill having a rotary blade rotating at high speed and a liner located on the outer periphery of the rotary blade. The coarsely crushed pieces M2 that have flowed into the defibrating section 13 are agglomerated by being sandwiched between the rotary blade and the liner.

In addition, the defibrating section 13 can generate a flow of air, that is, an airflow from the reserving section 12 toward the sorting section 14 due to the rotation of the rotary blade. As a result, the coarsely crushed pieces M2 can be sucked from the pipe 241 to the defibrating section 13. In addition, after the defibrating process, the defibrated material M3 can be sent to the sorting section 14 through the pipe 242.

The blower 261 is installed in the middle of the pipe 242. The blower 261 is an airflow generation device that generates airflow toward the sorting section 14. As a result, the sending of the defibrated material M3 to the sorting section 14 is promoted.

The sorting section 14 is a part that performs a sorting step of sorting the defibrated material M3 according to the length of the fiber. In the sorting section 14, the defibrated material M3 is sorted into a first sorted material M4-1 and a second sorted material M4-2 which has a fiber length longer than the first sorted material M4-1. The first sorted material M4-1 has a size suitable for manufacturing the subsequent recycled paper S, and the average fiber length thereof is as described above. On the other hand, the second sorted material M4-2 includes, for example, a material with insufficient defibration, a material in which the defibrated fibers are excessively agglomerated, and the like.

The sorting section 14 has a drum section 141 and a housing section 142 that houses the drum section 141.

The drum section 141 is a sieve that is formed of a net body having a cylindrical shape and rotates around a central axis thereof. The defibrated material M3 flows into the drum section 141. Then, when the drum section 141 rotates, the defibrated material M3 smaller than the mesh opening of the net is sorted as the first sorted material M4-1, and the defibrated material M3 having a size which is equal to or larger than the mesh opening of the net is sorted as the second sorted material M4-2.

The first sorted material M4-1 falls from the drum section 141.

On the other hand, the second sorted material M4-2 is sent to a pipe 243 coupled to the drum section 141. The pipe 243 is coupled to the pipe 241 on a side opposite to the drum section 141, that is, upstream. The second sorted material M4-2 that passes through the pipe 243 merges with the coarsely crushed pieces M2 in the pipe 241 and flows into the defibrating section 13 together with the coarsely crushed pieces M2. As a result, the second sorted material M4-2 is returned to the defibrating section 13, and the defibrating process is performed thereon, together with the coarsely crushed pieces M2.

In addition, the first sorted material M4-1 that falls from the drum section 141 falls while being dispersed in the air, and is directed for the first web forming section 15 located downward the drum section 141. The first web forming section 15 is a part that performs the first web forming step of forming the first web M5 from the first sorted material M4-1. The first web forming section 15 includes a mesh belt 151, three tension rollers 152, and a suction section 153.

The mesh belt 151 is an endless belt on which the first sorted material M4-1 is accumulated. The mesh belt 151 is hung around the three tension rollers 152. Then, the first sorted material M4-1 on the mesh belt 151 is transported downstream by the rotational drive of the tension rollers 152.

The first sorted material M4-1 has a size which is equal to or larger than the mesh opening of the mesh belt 151. As a result, the first sorted material M4-1 is restricted to pass through the mesh belt 151, and thus the first sorted material M4-1 can be accumulated on the mesh belt 151. In addition, since the first sorted material M4-1 is transported downstream for each the mesh belt 151 while being accumulated on the mesh belt 151, the first sorted material M4-1 is formed as a layer-shape first web M5.

In addition, there is a problem in that, for example, dust, dirt, and the like are mixed in the first sorted material M4-1. The dust and the dirt may be generated, for example, by coarsely crushing or defibrating. Then, such dust and dirt will be collected by the collection section 27, which will be described later.

The suction section 153 is a suction mechanism that sucks air from downward the mesh belt 151. As a result, the dust and dirt that pass through the mesh belt 151 can be sucked together with the air.

In addition, the suction section 153 is coupled to the collection section 27 through a pipe 244. The dust and dirt sucked by the suction section 153 are collected by the collection section 27.

A pipe 245 is further coupled to the collection section 27. The blower 262 is installed in the middle of the pipe 245. Due to the operation of the blower 262, a suction force can be generated in the suction section 153. As a result, the formation of the first web M5 on the mesh belt 151 is prompted. The first web M5 is obtained by removing the dust, the dirt, and the like. In addition, the dust and dirt pass through the pipe 244 and reach the collection section 27 by the operation of the blower 262.

The housing section 142 is coupled to the humidifying section 232. The humidifying section 232 is configured by a vaporization type humidifier. As a result, humidified air is supplied into the housing section 142. The first sorted material M4-1 can be humidified by the humidified air, and thus it is also possible to suppress the first sorted material M4-1 from adhering to the inner wall of the housing section 142 due to electrostatic force.

The humidifying section 235 is disposed downstream the sorting section 14. The humidifying section 235 is configured by an ultrasonic humidifier that sprays water. As a result, water can be supplied to the first web M5, and thus the water content of the first web M5 is adjusted. With the adjustment, the adsorption of the first web M5 to the mesh belt 151 due to the electrostatic force can be suppressed. As a result, the first web M5 is easily peeled off from the mesh belt 151 at a position where the mesh belt 151 is folded back by the tension roller 152.

The subdividing section 16 is disposed downstream the humidifying section 235. The subdividing section 16 is a part that performs the dividing step of dividing the first web M5 peeled from the mesh belt 151. The subdividing section 16 has a rotatably supported propeller 161 and a housing section 162 for housing the propeller 161. Then, the first web M5 can be divided by the rotating propeller 161. The first web M5 obtained through the division becomes the subdivided bodies M6. In addition, the subdivided bodies M6 descend in the housing section 162.

The housing section 162 is coupled to the humidifying section 233. The humidifying section 233 is configured by a vaporization type humidifier. As a result, humidified air is supplied into the housing section 162. Due to the humidified air, it is possible to suppress the subdivided bodies M6 from adhering to the inner wall of the propeller 161 or the housing section 162 due to electrostatic force.

A mixing section 17 is disposed downstream the subdividing section 16. The mixing section 17 is a part that performs the mixing step of mixing the subdivided bodies M6 and an additive. The mixing section 17 includes an additive supply section 171, a pipe 172, and a blower 173.

The pipe 172 is coupled to the housing section 162 of the subdividing section 16 and the housing 182 of the dispersion section 18, and is a flow path through which the mixture M7 of the subdivided bodies M6 and the additive passes.

The additive supply section 171 is coupled to the middle of the pipe 172. The additive supply section 171 has a housing section 170 in which the additive is contained and a screw feeder 174 which is provided in the housing section 170. Due to the rotation of the screw feeder 174, the additive in the housing section 170 is pushed out from the housing section 170 and supplied into the pipe 172. The additive supplied into the pipe 172 is mixed with the subdivided bodies M6 to form the mixture M7.

Here, examples of the additive supplied from the additive supply section 171 include a binder for binding fibers to each other, a colorant for coloring the fibers, an agglomeration suppressant for suppressing the agglomeration of the fibers, a flame retardant for making the fibers and the like less flammable, a paper strength enhancer for enhancing the paper strength of the recycled paper S, a defibrated material, and the like, and one or more of these can be used in combination. Hereinafter, a case where the additive is the binder P1 will be described as an example. When the additive contains the binder P1 that binds the fibers to each other, the strength of the recycled paper S can be increased.

Examples of the binder P1 include, for example, ingredients derived from natural products, such as starch, dextrin, glycogen, amylose, hyaluronic acid, kudzu, konjac, dogtooth violet starch, etherified starch, esterified starch, natural gum glue, fiber inducing glue, seaweed, and animal protein, polyvinyl alcohol, polyacrylic acid, polyacrylamide, and the like. One or two or more selected from the ingredients can be used in combination. However, the ingredients derived from natural products are preferable, and the starch is more preferable. In addition, for example, various polyolefins, acrylic resins, thermoplastic resins such as polyvinyl chloride, polyester, and polyamide, various thermoplastic elastomers, and the like can also be used.

In addition to the binder P1, the additive supplied from the additive supply section 171 may include, for example, a colorant for coloring the fibers, an agglomeration suppressant for suppressing agglomeration of the fibers or the binder P1, a flame retardant for making fibers and the like less flammable, a paper strength enhancer for enhancing the paper strength of the recycled paper S, and the like. Alternatively, an object obtained by including the additives in the binder P1 in advance to form a composite may be supplied from the additive supply section 171.

In addition, in the middle of the pipe 172, the blower 173 is installed downstream rather than the additive supply section 171. The mixing of the subdivided bodies M6 and the binder P1 is promoted due to the action of the rotating section, such as a blade, of the blower 173. In addition, the blower 173 can generate airflow toward the dispersion section 18. The subdivided bodies M6 and the binder P1 can be stirred in the pipe 172 by the airflow. As a result, the mixture M7 is transported to the dispersion section 18 in a state in which the subdivided bodies M6 and the binder P1 are uniformly dispersed. In addition, the subdivided bodies M6 in the mixture M7 are loosened in a process of passing through the pipe 172 to become a finer fiber form.

The blower 173 is electrically coupled to the control device 28, and the operation thereof is controlled. In addition, by adjusting the airflow rate of the blower 173, the amount of air sent into a drum 181 can be adjusted.

Although not shown in the drawing, the end of the pipe 172 on the side of the drum 181 branches into two, and the branching ends are coupled to inlets (not shown) formed on the end surface of the drum 181, respectively.

The dispersion section 18 shown in FIG. 3 is a part that performs the releasing step of loosening and releasing the fibers intertwined with each other in the mixture M7. The dispersion section 18 includes the drum 181 that introduces and releases the mixture M7 that is the defibrated material, and the housing 182 that houses the drum 181.

The drum 181 is a sieve that is formed of a net body having a cylindrical shape and rotates around a central axis thereof. When the drum 181 rotates, the fibers or the like, which are smaller than the mesh opening, in the mixture M7 can pass through the drum 181. At that time, the mixture M7 is loosened and released together with the air. That is, the drum 181 functions as a release section that releases a material containing the fiber.

The drum 181 is coupled to a drive source (not shown), and rotates by a rotational force output from the drive source. The drive source is electrically coupled to the control device 28, and the operation thereof is controlled.

In addition, the housing 182 is coupled to the humidifying section 234. The humidifying section 234 is configured by a vaporization type humidifier. As a result, humidified air is supplied into the housing 182. The inside of the housing 182 can be humidified by the humidified air, and thus it is possible to suppress the mixture M7 from adhering to the inner wall of the housing 182 due to electrostatic force.

In addition, the mixture M7 released by the drum 181 falls while being dispersed in the air, and is directed for the second web forming section 19 located downward the drum 181. The second web forming section 19 is a part that performs the accumulating step of accumulating the mixture M7 to form the second web M8 which is the accumulated material. The second web forming section 19 has a mesh belt 191, a tension roller 192, and a suction section 193.

The mesh belt 191 is a mesh member, and is configured by an endless belt in the configuration shown in the drawing. In addition, the mixture M7 dispersed and released by the dispersion section 18 is accumulated on the mesh belt 191. The mesh belt 191 is hung around four tension rollers 192. Then, due to the rotational drive of the tension roller 192, the mixture M7 on the mesh belt 191 is transported downstream.

In the configuration shown in the drawing, a configuration in which the mesh belt 191 is used as an example of the mesh member is described, but the present disclosure is not limited thereto, and, for example, a flat plate shape may be used.

In addition, most of the mixture M7 on the mesh belt 191 has a size which is equal to or larger than the mesh opening of the mesh belt 191. As a result, the mixture M7 is restricted from passing through the mesh belt 191, and thus the mixture M7 can be accumulated on the mesh belt 191. In addition, since the mixture M7 is transported downstream for each the mesh belt 191 while being accumulated on the mesh belt 191, the mixture M7 is formed as a layer-shape second web M8.

The suction section 193 is a suction mechanism that sucks air from downward the mesh belt 191. As a result, the mixture M7 can be sucked onto the mesh belt 191, and thus the accumulation of the mixture M7 on the mesh belt 191 is promoted.

A pipe 246 is coupled to the suction section 193. A blower 263 is installed in the middle of the pipe 246. Due to the operation of the blower 263, a suction force can be generated in the suction section 193.

The humidifying section 236 is disposed downstream the dispersion section 18. The humidifying section 236 is configured by an ultrasonic humidifier similar to the humidifying section 235. As a result, water can be supplied to the second web M8, and thus the water content of the second web M8 is adjusted. By the adjustment, the adsorption of the second web M8 to the mesh belt 191 due to the electrostatic force can be suppressed. As a result, the second web M8 is easily peeled off from the mesh belt 191 at a position where the mesh belt 191 is folded back by the tension roller 192.

It is preferable that the total water content added to the humidifying sections 231 to 236 is 0.5 parts by mass or more and 20 parts by mass or less with respect to 100 parts by mass of the material before humidification.

The molding section 20 is disposed downstream the second web forming section 19. The molding section 20 is a part that performs the sheet forming step of forming the recycled paper S from the second web M8. The molding section 20 has a pressurizing section 201 and a heating section 202.

The pressurizing section 201 has a pair of calendar rollers 203, and can pressurize the second web M8 between the calendar rollers 203 without heating. As a result, the density of the second web M8 is increased. It is preferable that the degree of heating when heating is, for example, a degree in which the binder P1 is not melted. Then, the second web M8 is transported toward the heating section 202. One of the pair of calendar rollers 203 is a driving roller driven by an operation of a motor (not shown), and the other is a driven roller.

The heating section 202 has a pair of heating rollers 204, and can pressurize the second web M8 while heating the second web M8 between the heating rollers 204. By heating and pressurizing, the binder P1 is melted in the second web M8, and the fibers are bonded to each other via the melted binder P1. As a result, the recycled paper S is formed. Then, the recycled paper S is transported toward the cutting section 21. One of the pair of heating rollers 204 is the driving roller driven by the operation of the motor (not shown), and the other is the driven roller.

The cutting section 21 is disposed downstream the molding section 20. The cutting section 21 is a part that performs the cutting step of cutting the recycled paper S. The cutting section 21 has a first cutter 211 and a second cutter 212.

The first cutter 211 cuts the recycled paper S in a direction intersecting the transport direction of the recycled paper S, particularly in a direction orthogonal to the transport direction.

The second cutter 212 cuts the recycled paper S in a direction parallel to the transport direction of the recycled paper S downstream the first cutter 211. The cutting is removing unnecessary parts of both ends of the recycled paper S in the width direction to adjust the width of the recycled paper S.

By the cutting with the first cutter 211 and the second cutter 212, the recycled paper S having a desired shape and size can be obtained. Then, the recycled paper S is transported further downstream and laid in the stock section 22.

Each section of the sheet manufacturing apparatus 1 is electrically coupled to the control device 28. The operation of each of the sections is controlled by the control device 28.

The display section 29 shown in FIG. 2 is a display provided at an arbitrary position outside the housing 10 of the sheet manufacturing apparatus 1. Examples of the type of the display include a liquid crystal display, an organic EL display, and the like. The display section 29 is driven by the control device 28 to control the display content.

As shown in FIG. 2, the control device 28 includes a control section 281, a storage section 282, and a communication section 283.

The control section 281 has at least one processor and executes various programs stored in the storage section 282. As the processor, for example, a Central Processing Unit (CPU) can be used. In addition, the control section 281 has various functions including a function of controlling the drive of each portion related to sheet manufacturing in the sheet manufacturing apparatus 1, a function of controlling the drive of the display section 29, a function as the determination section 8 that determines whether or not the coarsely crushed pieces M2 in the container 50 is suitable as the raw material for sheet manufacturing by the sheet manufacturing apparatus 1 based on the information read by the reading section 6, a function of controlling the operation of the switching section 7 according to the determination result of the determination section 8 and switching between the first state in which the container 50 can be loaded into the container loading section 121 and a second state in which the container 50 is prevented from being loaded into the container loading section 121, a function of generating the display information related to the determination result of the determination section 8, a function of generating the display information related to the remaining amount based on the information related to the remaining amount of the reserving section 12, and a function of transmitting and receiving the device ID and the user ID, which will be described later.

That is, the control section 281 has the determination section 8 that determines whether or not the coarsely crushed pieces M2 in the container 50 are suitable as the raw material for sheet manufacturing by the sheet manufacturing apparatus 1 based on the information read by the reading section 6.

The determination of eligibility of the coarsely crushed pieces M2 performed by the determination section 8 is performed, for example, as follows.

The reference for the quality of the recycled paper S to be generated, for example, the reference related to each quality item, such as sheet thickness, strength, sheet surface smoothness, uniformity, and whiteness, is set in advance and stored in the storage section 282. On the other hand, in the storage section 282, each of the characteristics, such as the shape, the size, the thickness, the basis weight, the paper type, and the paper quality of the coarsely crushed pieces M2 described above, is associated with each quality item estimated to be expressed when sheet manufacturing is performed under the characteristics, that is, tabulated or stored as a calibration line. Then, when the recycled paper S is generated using the coarsely crushed pieces M2 based on the pieces of characteristic information of the coarsely crushed pieces M2 read from the information carrying section 5 and the table or the calibration line, whether or not the reference is satisfied is comprehensively determined. When the reference is satisfied, the eligibility of the coarsely crushed pieces M2 is determined to be "appropriate" or "OK", and when the reference is not satisfied, the eligibility is determined to be "inappropriate" or "NO". When the pieces of characteristic information of the coarsely crushed pieces M2 read from the information carrying section 5 correspond to two or more items, for example, when the pieces of characteristic information include the size, the paper type, and the paper quality of the coarsely crushed pieces M2, the items of the respective pieces of characteristic information are comprehensively determined. In addition, when determination is performed, predetermined weighting may be performed for each of the items of the pieces of characteristic information. In addition, predetermined weighting may be performed on the quality items to be compared. The determination of the eligibility for the coarsely crushed pieces M2 as described above is an example, and the present disclosure is not limited thereto.

The storage section 282 stores, for example, a program for controlling the drive of the display section 29, the detection result of the remaining amount detector 30, that is, data related to the remaining amount of the coarsely crushed pieces M2 in the reserving section 12, the maximum capacity of the container 50 loaded into the reserving section 12, a program for processing the information read by the reading section 6, the reference related to each quality item supplied for determination by the determination section 8, data related to each of the pieces of characteristic information, the table or the calibration line, a weighting coefficient of the quality item or the piece of characteristic information, a program for determination by the determination section 8, a program for controlling the operation of the switching section 7, the ID information of the user of the sheet manufacturing apparatus 1, the ID information unique to the sheet manufacturing apparatus 1, and the like.

The communication section 283 is configured by, for example, an I/O interface, and communicates with each section of the sheet manufacturing apparatus such as the reading section 6, the switching section 7, the remaining amount detector 30, or the display section 29. In addition, the communication section 283 has, for example, a function of communicating with a computer or a server (not shown) via a network.

The control device 28 may be built in the sheet manufacturing apparatus 1 or may be provided in an external device such as an external computer. In addition, for example, the control section 281 and the storage section 282 may be integrated to be configured as one unit, or the control section 281 may be built in the sheet manufacturing apparatus 1 and the storage section 282 may be provided in an external device such as an external computer, or the storage section 282 may be built in the sheet manufacturing apparatus 1 and the control section 281 may be provided in an external device such as an external computer.

In the sheet manufacturing apparatus 1, the user needs to grasp the remaining amount of the coarsely crushed pieces M2 in the reserving section 12 and, if necessary, replenish the reserving section 12 with the desired coarsely crushed pieces M2.

As described above, the sheet manufacturing apparatus 1 has the remaining amount detector 30 that detects the remaining amount of the coarsely crushed pieces M2 in the reserving section 12. The control device 28 generates the display information based on the detection result of the remaining amount detector 30, that is, the information related to the remaining amount, and displays the display information on the display section 29. As a result, the user can easily grasp the remaining amount of the coarsely crushed pieces M2 in the reserving section 12 by looking at the display section 29.

As shown in FIG. 5, the display section 29 of the sheet manufacturing apparatus 1 displays the information related to the remaining amount of the coarsely crushed pieces M2 in the container 50 loaded into the reserving section 12 as the display information. Specifically, the remaining amount is displayed as turning on/turning off of the bar index on the indicator 291 of the display section 29. For example, when the remaining amount reaches the maximum capacity, that is, when the capacity is fully filled, all four bars are turned on. When the remaining amount is half of the maximum capacity, two of the four bars are turned on as shown in FIG. 5. When the remaining amount is 0, all four bars are turned off.

Further, although not shown in the drawing, the indicator 291 may quantify and display information on which the remaining amount is quantified, for example, the ratio to the maximum capacity, such as remaining amount "0%", "20%", "30%", "50%", "85%", and "100%".

The indicator 291 visually indicates a ratio of the current remaining amount to the maximum capacity of the reserving section 12. As a result, the user can grasp at a glance the ratio of the current remaining amount to the maximum capacity of the reserving section 12. Therefore, the user can easily and accurately grasp the remaining amount. As a result, the time when the coarsely crushed pieces M2 are replenished to the reserving section 12 can be easily grasped.

In addition, on the lower side of the indicator 291, there is a determination result display section 292 indicating the appropriate/inappropriate determination result in the determination section 8. The determination result display section 292 has two display elements. When the determination result of the determination section 8 is appropriate, the display element marked with "OK" is turned on as shown in FIG. 5, and, when the determination result is inappropriate, the display element marked with "NO" is turned on. As a result, the user can visually recognize the display section 29 and easily and accurately grasp the determination result of the determination section 8. As a result, it is possible to easily grasp whether or not the container 50 can be loaded into the reserving section 12.

In addition, although not shown in the drawing, instead of the determination result display section 292, a switching display section that displays the result of switching execution of the switching section 7, that is, whether the current state is the first state or the second state may be provided. In this case, similarly to the above, it is possible to easily grasp whether or not the container 50 can be loaded into the reserving section 12. The display section 29 may be provided with both the determination result display section 292 and the switching display section.

The display form of the remaining amount of the coarsely crushed pieces M2, the determination result of the determination section 8, the result of the switching execution of the switching section 7, or the like is not particularly limited, and may be the display form displayed with, for example, text such as alphabets, symbols, figures, patterns, or something including these.

As described above, when the determination result in the determination section 8 or the result of the switching execution of the switching section 7 is displayed on the display section 29, the user can grasp more reliably and quickly the suitability of the coarsely crushed pieces M2 to be replenished in the reserving section 12.

In the present embodiment, when the determination result of the determination section 8 or the result of the switching execution of the switching section 7 is displayed on the display section 29, notification is provided to the user. However, a notification method is not limited thereto, and, for example, the notification may be performed by turning on a lamp or by sound. Therefore, the display section 29 can be referred to as a notification section that notifies the determination result or the like.

As described above, the sheet manufacturing apparatus 1 of the present disclosure is an apparatus for manufacturing the sheet-shaped recycled paper S using the coarsely crushed pieces M2 obtained by coarsely crushing the sheet containing fibers as the raw material, the sheet manufacturing apparatus 1 including the container loading section 121 that is configured to load the container 50 in which the coarsely crushed pieces M2 are housed and which has the information carrying section 5 for carrying the piece of characteristic information which is the information related to the characteristic of the housed coarsely crushed pieces M2, the reading section 6 that reads information carried by the information carrying section 5, the determination section 8 that determines whether or not the coarsely crushed pieces M2 in the container 50 are suitable as the raw material for sheet manufacturing by the sheet manufacturing apparatus 1 based on the information read by the reading section 6, and the switching section 7 that switches between the first state in which the container 50 can be loaded into the container loading section 121 and the second state in which the container 50 is prevented from being loaded into the container loading section 121 according to the determination result of the determination section 8. As above, the sheet manufacturing apparatus 1 determines the eligibility of the coarsely crushed pieces M2 in the container 50 as the raw material for sheet manufacturing based on the information related to the characteristics of the coarsely crushed pieces M2 read by the reading section 6, determines whether or not the container 50 can be loaded into the container loading section 121 according to the determination result, and executes the loading. As a result, it is possible to avoid sheet manufacturing under conditions unsuitable for sheet manufacturing, for example, conditions where the quality may be equal to or less than the reference, and it is possible to further improve the quality of the recycled paper S, which is the sheet to be generated.

Second Embodiment

Figure 6:
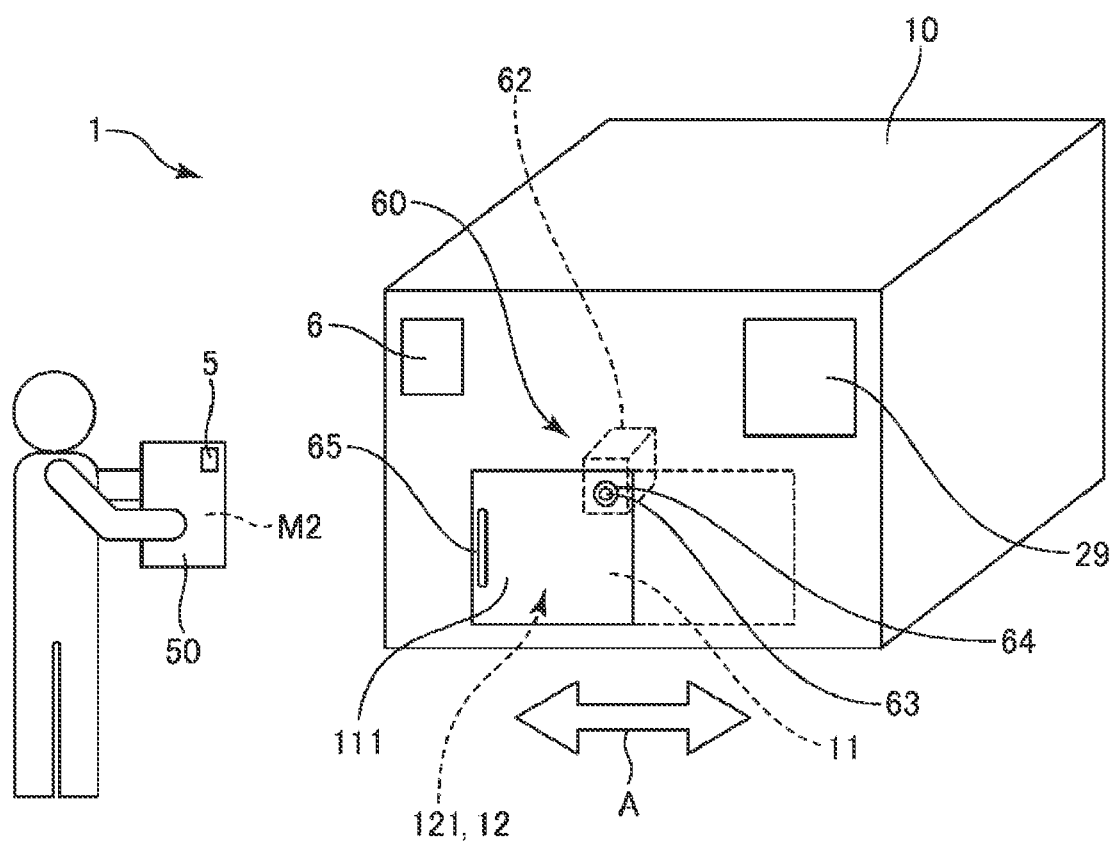
FIG. 6 is a perspective view showing an outline of a sheet manufacturing apparatus according to a second embodiment.
Figure 7:
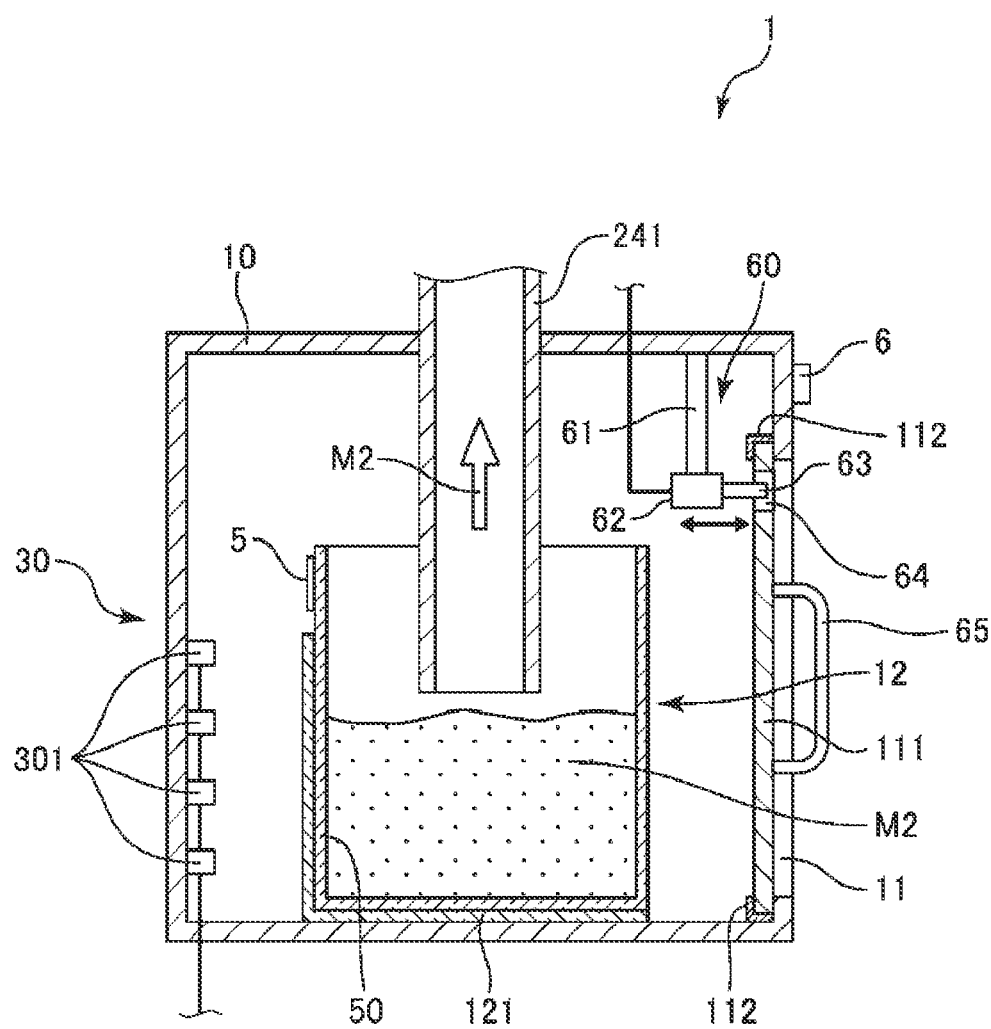
FIG. 7 is a cross-sectional side view of a reserving section included in the sheet manufacturing apparatus shown in FIG. 6.

FIG. 6 is a perspective view showing an outline of a sheet manufacturing apparatus according to a second embodiment. FIG. 7 is a cross-sectional side view of a reserving section included in the sheet manufacturing apparatus shown in FIG. 6.

Hereinafter, the second embodiment of the sheet manufacturing apparatus of the present disclosure will be described with reference to FIGS. 6 and 7, and the differences from the first embodiment will be described and the description of common points will be omitted. In FIGS. 6 and 7, an upper side may be referred to as "upper" or "upward", and a lower side may be referred to as "lower" or "downward".

A sheet manufacturing apparatus 1 of the second embodiment has an insertion port 11 for inserting the container 50 in which the coarsely crushed pieces M2 are housed, and a reserving section 12 for reserving the inserted coarsely crushed pieces M2.

The sheet manufacturing apparatus 1 has a housing 10 for containing the reserving section 12, and the insertion port 11 for inserting the coarsely crushed pieces M2 is provided on the wall portion of the housing 10. The insertion port 11 has openings provided in the wall portions on the front surface in FIG. 6 and the right surface in FIG. 7 of the housing 10. In addition, the insertion port 11 is provided with an opening/closing door 111 that opens and closes the opening of the insertion port 11. When the opening/closing door 111 is in an opened state, the container 50 in which the coarsely crushed pieces M2 are housed can be loaded into the container loading section 121 of the reserving section 12, or an empty container 50 or a container 50 having a low remaining amount can be taken out from the container loading section 121 of the reserving section 12.

The opening/closing door 111 is slidably supported by rails 112 respectively installed at the upper end and the lower end of the insertion port 11 in a direction of arrow A in FIG. 6, that is, in a direction perpendicular to a paper surface in FIG. 7. A handle 65 is installed on the opening/closing door 111, and the user grips the handle 65 and slides the opening/closing door 111 in the direction of arrow A to open and close the insertion port 11. The opening/closing door 111 can be locked by a locking section 60.

The locking section 60 constitutes a so-called locking mechanism, and has a solenoid 62 installed on the upward wall portion of the insertion port 11 as a drive source. The solenoid 62 is supported and fixed to the housing 10 by a support member 61. The solenoid 62 is electrically coupled to an energization circuit including a relay or a switch, and the operation of the energization circuit is controlled by the control section 281 of the control device 28 described above. The solenoid 62 has a pin 63, and the pin 63 expands and contracts in an arrow direction in FIG. 7 by the energization and de-energization of the solenoid 62 is energized and deenergized.

A hole 64 into which the pin 63 can be inserted is formed at the upper portion of the opening/closing door 111. When the opening/closing door 111 is in the closed state and the solenoid 62 is energized, the pin 63 extends and the tip end portion of the pin 63 is inserted into the hole 64. As a result, the opening/closing door 111 is in a locked state, that is, the second state, the movement to the right direction in FIG. 6 is restricted, and the opening/closing door 111 cannot be opened. When the energization of the solenoid 62 is stopped from this state, the pin 63 contracts and the tip end portion of the pin 63 comes out of the hole 64. As a result, the opening/closing door 111 is in a locking released state in which locking is released, that is, the first state, and the opening/closing door 111 can move in the direction of arrow A. Therefore, it is possible to grip the handle 65 and slide the opening/closing door 111 in the right direction in FIG. 6 to make the insertion port 11 be in the opened state.

The relationship between the energization and de-energization of the solenoid 62 and the extension and contraction of the pin 63 may be the reverse of the above. In addition, the locking section 60 may be installed downward the insertion port 11. A known electronic locking mechanism may be used as the locking section 60.

Similar to the first embodiment, the sheet manufacturing apparatus 1 includes the reading section 6 that reads the information carried by the information carrying section 5 attached to the container 50, the determination section 8 that determines suitability of the coarsely crushed pieces M2 in the container 50 as the raw material for sheet manufacturing in the sheet manufacturing apparatus 1 based on the information read by the reading section 6, and the locking section 60 that is the switching section 7 which switches between the first state in which the container 50 can be loaded into the container loading section 121 and the second state in which the container 50 is prevented from being loaded into the container loading section 121 according to the determination result of the determination section 8.

Here, the first state is to set the opening/closing door 111 in the locking released state, and the second state is to set the opening/closing door 111 in the closed state into the locked state.

The configurations and operations of the container 50, the information carrying section 5, the reading section 6, the determination section 8, the reserving section 12, the remaining amount detector 30, the control device 28, the display section 29, and the like are the same as described in the first embodiment.

As described above, the sheet manufacturing apparatus 1 includes the insertion port 11 that loads the container 50 into the container loading section 121, and the opening/closing door 111 provided at the insertion port 11 to open and close the insertion port 11, in which the switching section 7 has the locking section 60 that switches between the first state in which the opening/closing door 111 is in the locking released state and the second state in which the opening/closing door 111 in the closed state is in the locked state. Accordingly, it is possible to more reliably switch between the first state and the second state with a simple configuration.

Hereinabove, although the sheet manufacturing apparatus of the present disclosure has been described with respect to each of the embodiments with reference to the drawings, the present disclosure is not limited thereto, and each section that constitutes the sheet manufacturing apparatus can be replaced with an arbitrary configuration that can exhibit similar functions. In addition, arbitrary components may be added to the sheet manufacturing apparatus. In addition, the sheet manufacturing apparatus of the present disclosure may combine the features of each embodiment.

In addition, although the sheet manufacturing apparatus of each of the embodiments is for manufacturing a sheet by a dry method, the present disclosure is not limited thereto, and a sheet manufacturing apparatus for manufacturing a sheet by a wet method may be used.

In addition, the sheet manufacturing apparatus may further have a coarsely crushing section having the same configuration as that of the coarsely crushing apparatus such as a shredder. In this case, the configuration of the coarsely crushing section can be a configuration in which, for example, a pair of coarsely crushing blades that rotate in opposite directions to each other are disposed upstream the reserving section 12.

In addition, the sheet manufacturing apparatus may be configured to have a container detector that detects a fact that the container 50 is loaded into the reserving section 12, and to display loading/unloading of the container 50 detected by the container detector in the reserving section 12 on the display section 29 or other installed display section.

What is claimed is:

1. A sheet manufacturing apparatus that manufactures a sheet-shaped recycled paper using coarsely crushed pieces obtained by coarsely crushing a sheet containing fibers as a raw material, the sheet manufacturing apparatus comprising:
   a container loading section that is configured to load a container in which the coarsely crushed pieces are housed and which has an information carrying section for carrying information related to characteristics of the housed coarsely crushed pieces;
   a reading section that reads the information carried by the information carrying section;
   a determination section that determines whether or not the coarsely crushed pieces in the container are suitable as the raw material for sheet manufacturing by the sheet manufacturing apparatus based on the information read by the reading section; and
   a switching section that switches between a first state in which the container is configured to be loaded into the container loading section and a second state in which the container is prevented from being loaded into the container loading section according to a determination result of the determination section.

2. The sheet manufacturing apparatus according to claim 1, further comprising:
   an insertion port that loads the container into the container loading section; and
   an opening/closing door that is provided at the insertion port to open and close the insertion port, wherein
   the switching section has an opening/closing drive section that switches between the first state in which the opening/closing door is in an opened state and the second state in which the opening/closing door is in a closed state.

3. The sheet manufacturing apparatus according to claim 1, further comprising:
   an insertion port that loads the container into the container loading section; and
   an opening/closing door that is provided at the insertion port to open and close the insertion port, wherein
   the switching section has a locking section that switches between the first state in which the opening/closing door is in a locking released state and the second state in which the opening/closing door in a closed state is in a locked state.

4. The sheet manufacturing apparatus according to claim 1, wherein
   the information carried by the information carrying section is at least one piece of information of a shape, a size, a thickness, a basis weight, a paper type, a paper quality, a whiteness, a bulk density of a fiber, an average fiber length, and a water content of the coarsely crushed pieces.

5. The sheet manufacturing apparatus according to claim 1, wherein
   the information carried by the information carrying section includes at least one of ID information of a user who is permitted to use the sheet manufacturing apparatus and ID information of the sheet manufacturing apparatus, as additional information.

6. The sheet manufacturing apparatus according to claim 1, wherein
   the information carrying section is a two-dimensional or three-dimensional code, and
   the reading section is a code reader.

7. The sheet manufacturing apparatus according to claim 1, wherein
   the information carrying section is an IC tag, and
   the reading section is an IC reader.

* * * * *